United States Patent

Sugiyama et al.

[11] 4,032,387
[45] June 28, 1977

[54] WELDING APPARATUS

[75] Inventors: Masamichi Sugiyama, Isehara; Ryuzo Ebina, Tokyo; Minoru Tanaka, Kawasaki; Ikuo Sukekawa, Yokohama; Susumu Sawada, Machida, all of Japan

[73] Assignee: Mitsubishi Kasei Kogyo Kabushiki Kaisha, Tokyo, Japan

[22] Filed: Sept. 8, 1975

[21] Appl. No.: 611,550

[30] Foreign Application Priority Data

Sept. 12, 1974 Japan ............................ 49-105288

[52] U.S. Cl. .............................. 156/497; 100/295; 156/556; 156/580; 156/583; 156/285
[51] Int. Cl.² ................... B30B 15/06; B30B 15/34
[58] Field of Search .......... 156/499, 583, 152, 497, 156/285, 538, 556, 572, 580, 581; 136/176; 100/93 P, 264, 295

[56] References Cited

UNITED STATES PATENTS

| | | | |
|---|---|---|---|
| 3,175,939 | 3/1965 | Hanes et al. | 156/499 |
| 3,539,416 | 11/1970 | Sanders et al. | 156/499 |
| 3,682,748 | 8/1972 | Kimball | 156/499 |
| 3,686,056 | 8/1972 | Fiandt | 156/499 |
| 3,717,538 | 2/1973 | Hartung | 156/497 |
| 3,873,400 | 3/1975 | Tsuchida et al. | 156/499 |

*Primary Examiner*—Charles E. Van Horn
*Assistant Examiner*—M. G. Wityshyn
*Attorney, Agent, or Firm*—Oblon, Fisher, Spivak, McClelland & Maier

[57] ABSTRACT

In welding apparatus of the type comprising a pair of opposed pressing boards, and a heated platen inserted into and retracted from a space between the pressing boards and the surfaces of the articles to be welded together are fused by the heated platen and then welded together by applying a pressure to the articles, there are provided holding mechanisms for holding the article at the opposing surfaces of the pressing boards and a spacer for defining predetermined gaps between the heated platen and the pressing boards.

9 Claims, 3 Drawing Figures

WELDING APPARATUS

BACKGROUND OF THE INVENTION

This invention relates to welding apparatus, and more particularly to welding apparatus suitable for welding together large molded articles having large and flat surfaces to be welded.

To weld together molded articles, for example plastic sheets formed by injection molding of extrustion molding or like techniques, it is usual to fuse the surfaces of the sheets to be welded together by a heated platen or the like and apply a pressure across superposed sheets. However, where the size of the molded articles is large, and the area to be welded is large but the width thereof is narrow, as in the case of welding molded articles having ribs on their surfaces, it is necessary to accurately adjust the relative positions of the articles and fusion allowance so as to uniformly heat the surfaces to be welded and to make constant the thickness of the fused or welded layer.

One example of such welded article is a pallet utilized to transport goods. A pallet is generally prepared by welding together two molded sheets each provided with a plurality of spaced parallel legs on the inner surface. Each leg is hollow and has a substantially rectangular cross-section having rounded ends. The wall of each leg projects as a rib from the inner surface of the sheet. To weld together two sheets, the rib shaped walls of corresponding legs are abutted against each other and then welded together.

In view of these requirements we have now completed novel welding apparatus wherein pressing plates of a special construction are used to apply a pressure across superposed molded articles which are heated and fused by a heated platen.

SUMMARY OF THE INVENTION

Accordingly, it is an object of this invention to provide an improved welding apparatus capable of uniformly heating the surfaces to be welded and making constant the thickness of the welded layer.

Another object of this invention is to provide an improved welding apparatus especially suitable for welding together molded sheets of plastic materials capable of holding the sheets to be welded in correct relative position during welding.

Still another object of this invention is to provide novel welding apparatus in which the thickness of the fused or welded layer can be varied.

According to this invention these and other objects can be accomplished by providing welding apparatus of the class comprising a pair of opposed pressing boards, means to move the pressing boards toward and away from each other for receiving therebetween superposed articles to be welded together, a heated platen for heating the surfaces of the articles, and means for reciprocating the heated platen between an operative position between the pressing boards and an inoperative position outside of the pressing boards, characterized in that holding mechanisms are provided for holding the articles to be welded on the opposing surface of respective pressing boards and that a spacer is provided for defining predetermined gaps between the heated platen and the pressing boards.

It is advantageous to construct the welding apparatus such that the pressing boards are moved in the vertical direction and that the heated platen is moved in the horizontal direction. Further, it is advantageous to form the holding mechanisms as vacuum operated suction discs.

DESCRIPTION OF THE PREFERRED EMBODIMENT

Figure 1:
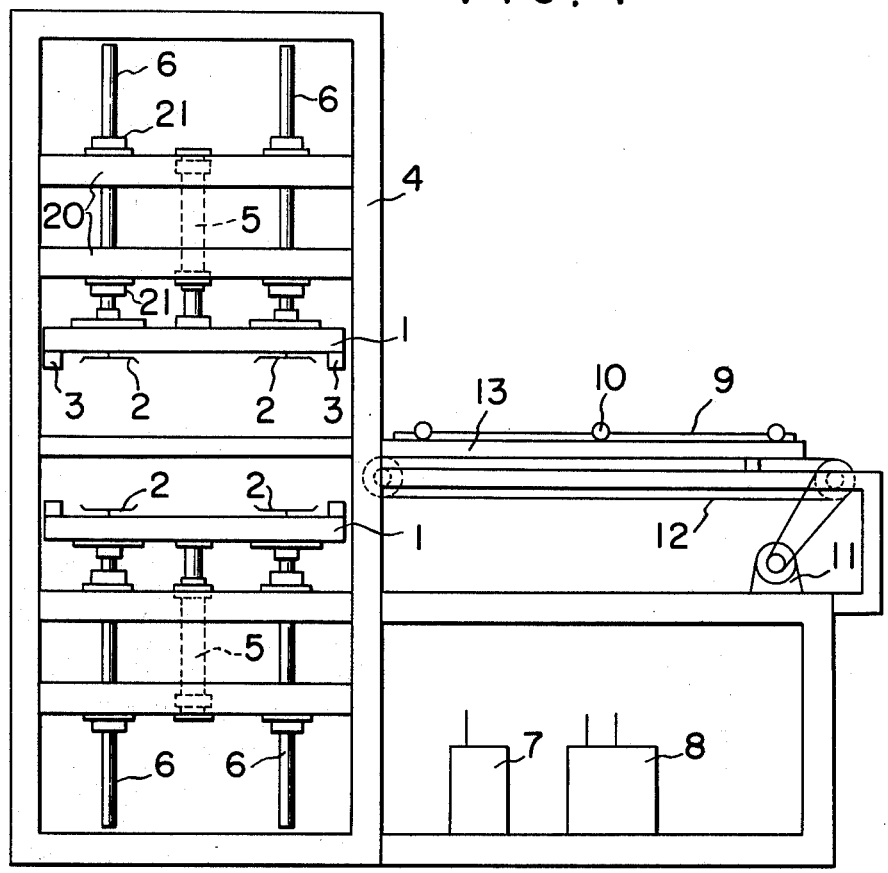
FIG. 1 is a side view showing one embodiment of the novel welding apparatus embodying the invention.

The welding apparatus illustrated in FIG. 1 comprises a pair of opposed pressing boards 1 each provided with suction discs 2 and spacers 3 on the inner surface and operated in the vertical direction by an oil pressure cylinder 5 mounted on horizontal supporting beams 20 of a rectangular frame 4. The vertical movements of the pressing boards 1 are guided by guide rods 6 extending through bushings 21 mounted on the beams 20 and the oil pressure cylinders 5 are operated by pressurized oil supplied from a source of pressurized oil 8. Each suction disc 2 is made of resilient material such as rubber and synthetic resins and the inside of the suction disc 2 is evacuated by a source of vacuum 7.

Figure 2:
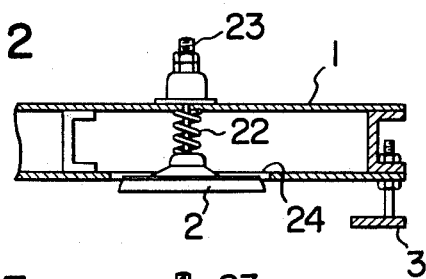
FIG. 2 is a partial sectional veiw showing the construction of a holding mechanism and a spacer utilized in the apparatus shown in FIG. 1, the holding mechanism being shown in its normal state.
Figure 3:
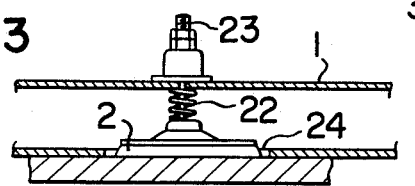
FIG. 3 is a sectional view similar to FIG. 2 and showing a stage in which an article is attracted by the holding mechanism.

FIG. 2 shows a preferred manner of mounting a suction disc 2 to the pressing board 1. As shown, suction disc 2 has a shallow dish shaped construction and is contained in recess 24 of the pressing board. The suction disc is biased to normally project slightly beyond the inner surface of the pressing board 1 by means of a spring 22. The center of the suction disc 2 is connected to the source of vacuum 7 through a pipe 23. When the interior of the suction disc 2 is evacuated after engagement with the surface of a molded article in a manner to be described later, the periphery of the disc is deformed toward the inside of the pressing board 1 and the suction disc is forced into the recess 24 against spring 22, thus urging the molded article against the inner surface of the pressing board 1, whereby the moulded article is held by the pressing board 1, as shown in FIG. 3. The spacers 3 may be mounted on the inner surfaces of either one or both of the pressing boards 1 or on the heated platen to be described later and have a height smaller than the thickness of the molded product held by the suction disc 2. In the example shown in FIG. 2, the spacer 3 is mounted on the board 1 by a bolt and nut, so that its height is adjustable.

On one side of the frame 4 is provided a horizontal heated plate 9 having the surface coated by a thin layer (not shown) of a fluorine resin or the like. One end of the heated platen 9 is secured to an endless chain 12 driven by a reversible electric motor 11. Heated platen 9 is heated by an electric heater, not shown, contained therein and reciprocated along guide rails 13 by a plurality of wheels 10. This construction assures correct positioning of the heated platen 9.

In operation, superposed sheets to be welded together are inserted between separated pressing boards 1. Then, the oil pressure cylinders 5 are operated to clamp the sheets between pressing boards 1 and the interior of the suction discs 2 is evacuated by the source of vacuum 7 to attract respective sheets toward respective pressing boards 1. Thereafter the pressing boards 1 are separated by the operation of the oil pressure cylinders 5. Motor 11 is rotated to insert the heated platen 9 between the thus separated sheets and the oil pressure cylinders 5 are operated in the opposite direction to press the sheets held by respective pressing boards 1 against the opposite surfaces of the heated platen 9, whereby the desired areas of the sheets are heated and fused. At this time, the fusion is continued until the heated platen 9 comes to engage spacers 3. In other words, the surface layer of the sheet having a thickness equal to the difference between the thickness of the sheet and the height of the spacer is fused. Then, the pressing boards holding the fused sheets are separated from the heated platen by the operation of the oil pressure cylinders 5 and the rotation of motor 11 is reversed to retract the heated platen to the position shown in FIG. 1. Having completed the preliminary fusing operation, the pressing boards 1 are now closed to weld together the sheets at the fused portions thereof. After cooling, the assembly of the welded sheets is removed from the welding apparatus.

As has been described above since the spacing between the pressing board and the heated platen is made constant by the spacers the depth of the fused layer of the sheet is also uniform thus assuring homogeneous wleding having a fused or welded layer of uniform thickness. If desired, the above described series of operations may be performed automatically.

Although many other holding mechanisms may be used as the holding mechanism for the articles to be welded instead of the suction discs or cups described above, suction discs are preferred because they can positively hold the article without applying thereto any objectionable mechanical stress.

Of course the height of the spacers should be adjusted according to the thickness of the articles to be welded and the desired thickness of the welded layer.

Although in the foregoing description, for the sake of simplicity, the articles to be welded together were described as flat moulded sheets, actually the articles to be welded together take complicated configurations as in the case of pallets described above.

We claim:

1. In welding apparatus of the class comprising a pair of opposed pressing boards, means to move said pressing boards toward and away from each other for receiving therebetween superposed articles to be welded together, a heated platen for heating the surfaces of said articles, means for reciprocating said heated platen between an operative position defined between said pressing boards and an inoperative position defined outside of the area between said pressing boards, a holding mechanism for holding said articles to be welded upon the opposing surfaces of said pressing boards, and spacer means for defining predetermined gaps between said heated platen and said pressing boards, the improvement comprising:

said spacer means is mounted upon either one or both of said pressing boards and said heated platen and has a height smaller than the thickness of the article to be welded so that the surface layer of said article having a thickness equal to the difference between the thickness of said article and the height of said spacer is fused by said heated platen; and said holding mechanism comprises suction disc means made of resilient material and connected to a source of vacuum, and disposed in a recess of said pressing board, and spring means is provided for biasing said suction disc so as to normally protrude beyond the inner surface of said pressing head, yet when said suction disc is actuated so as to attract said article to be welded and said pressing board is actuated toward said platen, said suction disc is retracted into said recess against the biasing force of said spring means.

2. The welding apparatus according to claim 1, wherein; a plurality of independent suction discs are mounted on the inner surface of each pressing board at spaced points thereof.

3. The welding apparatus according to claim 1 wherein the height of said spacer is adjustable.

4. The welding apparatus according to claim 1 wherein said pressing boards are moved in the vertical direction.

5. The welding apparatus according to claim 1 wherein said means for moving said pressing boards comprises fluid pressure actuators.

6. The apparatus according to claim 1 wherein said articles to be welded together comprise two flat molded sheets, each provided with hollow spaced legs on their inner surface and the ends of corresponding legs of the two sheets are fused and welded together to form a pallet.

7. The apparatus according to claim 1 wherein said heated platen is moved in the horizontal direction.

8. The apparatus according to claim 1 wherein said heated platen is provided with wheels running along guide rails.

9. The welding apparatus according to claim 8 wherein said heated platen is connected to a chain driven by a driving means.

* * * * *